United States Patent
Leymin et al.

(10) Patent No.: US 7,679,570 B2
(45) Date of Patent: Mar. 16, 2010

(54) TRANSMISSION AND/OR RECEPTION DEVICE WHICH IS INTENDED TO BE MOUNTED TO A VEHICLE WHEEL AND A HOUSING FOR ONE SUCH DEVICE

(75) Inventors: Frédéric Leymin, Clermont-Ferrand (FR); Michael A. Hart, Dexter, MI (US)

(73) Assignees: Michelin Recherche et Technique S.A., Granges-Paccot (CH); TRW Automotive U.S., LLC, Livonia, MI (US)

( * ) Notice: Subject to any disclaimer, the term of this patent is extended or adjusted under 35 U.S.C. 154(b) by 595 days.

(21) Appl. No.: 10/598,350

(22) PCT Filed: Feb. 17, 2005

(86) PCT No.: PCT/EP2005/001618

§ 371 (c)(1), (2), (4) Date: May 29, 2007

(87) PCT Pub. No.: WO2005/086282

PCT Pub. Date: Sep. 15, 2005

(65) Prior Publication Data

US 2008/0088516 A1     Apr. 17, 2008

(30) Foreign Application Priority Data

Feb. 27, 2004   (FR) .................................. 04 02044

(51) Int. Cl.
*H01Q 1/32* (2006.01)
(52) U.S. Cl. ...................... 343/713; 343/788
(58) Field of Classification Search ............... 343/711, 343/713, 787, 788, 872
See application file for complete search history.

(56) References Cited

U.S. PATENT DOCUMENTS

| 3,778,836 | A | | 12/1973 | Tanaka |
| 4,743,917 | A | * | 5/1988 | Huntsman et al. ........... 343/877 |
| 4,894,663 | A | * | 1/1990 | Urbish et al. ............... 343/702 |
| 5,918,183 | A | | 6/1999 | Janky et al. |

(Continued)

FOREIGN PATENT DOCUMENTS

EP   1 002 669 A1   5/2000

(Continued)

OTHER PUBLICATIONS

International Search Report for PCT Application No. PCT/EP2005/001618 date of completion of the search May 18, 2005.

*Primary Examiner*—HoangAnh T Le
(74) *Attorney, Agent, or Firm*—Fitzpatrick, Cella, Harper & Scinto

(57) ABSTRACT

The invention provides a transmission and/or reception device for mounting on a wheel of a vehicle and a housing for such a device. The device includes a tire information device configured to provide information relating to a tire. A transmitter/receiver is electrically connected to the tire information device. An antenna is electrically connected to the transmitter/receiver for transmitting and/or receiving radio frequency signals. A housing is configured to house the tire information device and the transmitter/receiver. The antenna is formed by winding a cable on an outside face of the housing.

20 Claims, 2 Drawing Sheets

U.S. PATENT DOCUMENTS

| | | |
|---|---|---|
| 5,987,980 A | 11/1999 | Mangafas et al. |
| 6,462,481 B1 * | 10/2002 | Holland et al. ......... 315/111.21 |
| 6,470,933 B1 | 10/2002 | Volpi |
| 6,474,380 B1 | 11/2002 | Rensel et al. |
| 2002/0103425 A1 * | 8/2002 | Mault ......................... 600/373 |
| 2003/0000615 A1 | 1/2003 | Volpi |
| 2004/0201536 A1 | 10/2004 | Ohara et al. |
| 2006/0238424 A1 * | 10/2006 | Chen et al. .................. 343/702 |

FOREIGN PATENT DOCUMENTS

| | | |
|---|---|---|
| EP | 1 049 196 A1 | 11/2000 |
| EP | 1 467 436 A2 | 10/2004 |

* cited by examiner

TRANSMISSION AND/OR RECEPTION DEVICE WHICH IS INTENDED TO BE MOUNTED TO A VEHICLE WHEEL AND A HOUSING FOR ONE SUCH DEVICE

BACKGROUND OF THE INVENTION

1. Field of the Invention

The present invention relates to a transmission and/or reception device for mounting to a vehicle wheel, and also to a housing for such a device.

2. Related Art

Car manufacturers are tending to fit the wheels or tires of vehicles with devices that serve to provide information about the tires to a vehicle computer. Such devices include, for example, pressure sensors, temperature sensors, and devices for identifying tires. These tire information devices are coupled to transmission and/or reception devices.

It is known to make use of radio technology to enable the device to communicate with a computer. The same technology can also be used for transmitting energy to the device from a fixed point of the vehicle. To this end, a fixed antenna is provided on the vehicle. It is connected by electric cables to the computer and/or to an electrical power supply. The transmission and/or reception device associated with the tire information device is also connected to an antenna which is carried by the wheel or the tire.

Such communications technology raises the problem that the active area necessary for proper operation of the antenna requires the antenna to be rather large. Unfortunately, the transmission and/or reception device is generally integrated with the sensor in a common housing, which is miniaturized as much as possible, for reasons of weight and to avoid interfering with fitting the tire on the wheel. As a result, it is necessary to make use of an external antenna that is separate from the housing. This leads to several drawbacks relating to, for example, manufacturing costs, stock management, assembly difficulties, reliability, and overall weight.

SUMMARY OF THE INVENTION

The present invention seeks to provide a transmission and/or reception device that does not require an antenna that is separate from the housing.

The present invention provides a transmission and/or reception device for mounting on a wheel of a vehicle, the device comprising a housing and being characterized in that it includes an antenna carried on an outside face of the housing, the antenna including a cable which is wound around the housing. The section of the housing forms a solenoid, thereby constituting an antenna that is particularly suitable for the intended application. In particular, it is preferable for the housing to be shaped in such a manner as to be positioned on the wheel so that the orientation of the solenoid is parallel to an ortho-radial axis of the wheel, i.e., an axis that is at right angles to a radius and to the axis of the wheel.

The device of the invention takes advantage of the presence of a housing which, even though small in volume, nevertheless provides a section of non-negligible area, suitable for providing an area that is sufficient for the antenna.

In a particular embodiment, the outside face of the housing is shaped to protect the antenna. This protection is of use particularly while a tire is being mounted on the wheel, during which operation the bead of the tire slides in the assembly groove during inflation and rubs against the housing engaged in a corner of the groove. In a particular embodiment, the outside face of the housing has grooves suitable for receiving the cable. Such grooves can participate both in positioning and in protecting the cable.

In one aspect, the present invention provides a transmission and/or reception device for mounting on a wheel of a vehicle. The device includes a tire information device configured to provide information relating to a tire. A transmitter/receiver is electrically connected to the tire information device. An antenna is electrically connected to the transmitter/receiver for transmitting and/or receiving radio frequency signals. The device further includes a housing configured to house the tire information device and the transmitter/receiver. The antenna is formed by a cable wound around an outside face of the housing.

In another aspect, the present invention provides a housing for a transmission and/or reception device configured to be mounted to a vehicle wheel. The transmission and/or reception device including an antenna. The housing has an interior portion for housing the transmission and/or reception device and an outside face shaped to support a cable forming the antenna. The outside face is shaped to support a cable wrapped around the housing in a solenoidal arrangement.

Embodiments of the present invention may include one or more of the following features.

The tire information device may include a pressure sensor for measuring the pressure inside a tire mounted on the wheel.

As noted above, the outside face of the housing may be shaped to protect the antenna, and the housing may be shaped to be positioned on the wheel in such a manner that the wound cable forms a solenoid that is oriented along an ortho-radial axis of the wheel. The outside face of the housing may include grooves configured to receive the cable. The grooves may be shaped to receive the cable fully, in such a manner that the cable is protected by the ridges between the grooves against possible contact. The grooves may be formed by spaces between ribs formed on the outside face of the housing.

The device may include an outer protective film covering the antenna formed on the outside face of the housing. The film may be formed of a heat-shrink plastic material, such as polyethylene or polytetrafluoroethylene (PTFE). The film may be formed of polypropylene, polyphenylene sulphide (PPS), or polyamide.

An outside protecting layer may be molded onto the antenna formed on the outside face of the housing. The molded outside protective layer may be formed of the same material as the housing. The molded outside protective layer may be obtained by injection molding a thermosetting material, such as epoxy resin, phenolic resin, polycarbonate, polyurethane, polyamide, vinyl ester, or polyester. The molded outside protective layer may be formed of polyphthalamide (PPA).

BRIEF DESCRIPTION OF THE DRAWINGS

The invention will be better understood on reading the following description, given purely by way of example, and made with reference to the drawings, in which.

DETAILED DESCRIPTION OF THE EMBODIMENT

Figure 1:
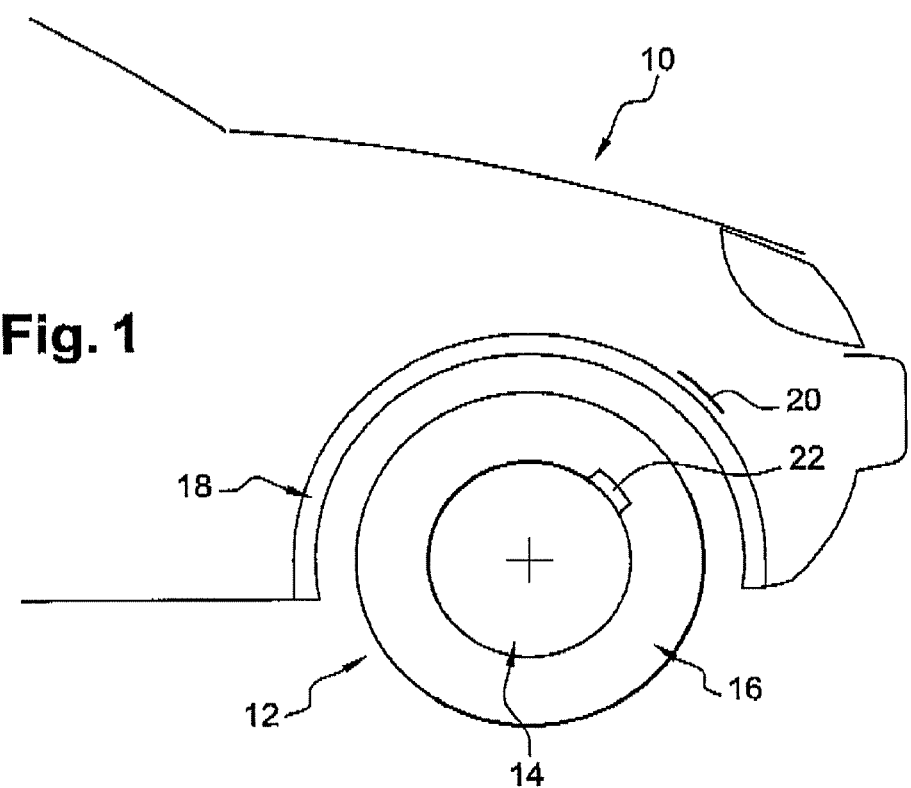
FIG. 1 is a diagram of the front of a vehicle seen from the side and provided with a device in accordance with the present invention.

FIG. 1 shows the front of a vehicle, given overall reference 10. The vehicle 10, which is a car in the example shown, has mounted assemblies, each having a wheel 14 carrying a tire 16, with only the front-right assembly 12 being shown. When mounted on the car 10, the assembly 12 is located in a wheel arch 18.

Figure 2:
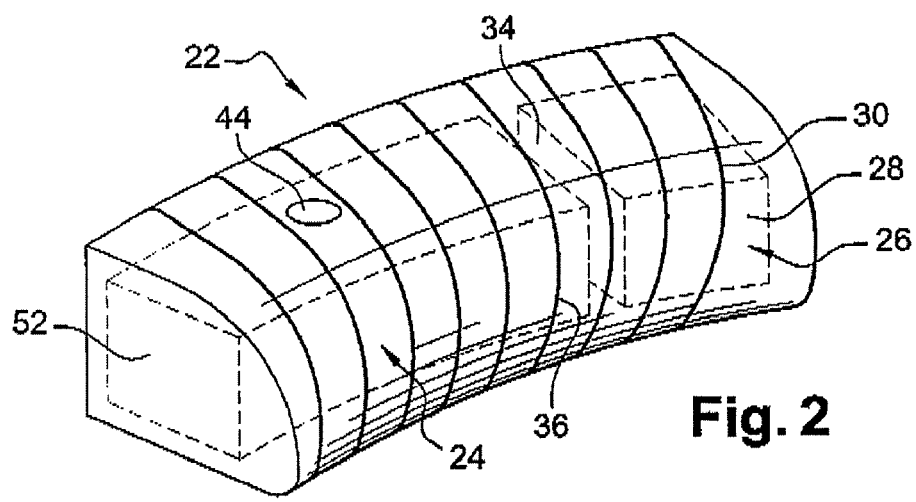
FIG. 2 is a detailed diagram of the device shown in FIG. 1.

The vehicle has an antenna 20 situated in the vicinity of the wheel arch 18 and designed to interact with a device 22 carried by the wheel 14. The device 22, which is shown in detail in FIG. 2, comprises a pressure sensor 24 coupled to a transmission and/or reception device 26. The transmission and/or reception device 26 comprises electronic transmitter/receiver 28 together with an antenna 30.

Figure 3:
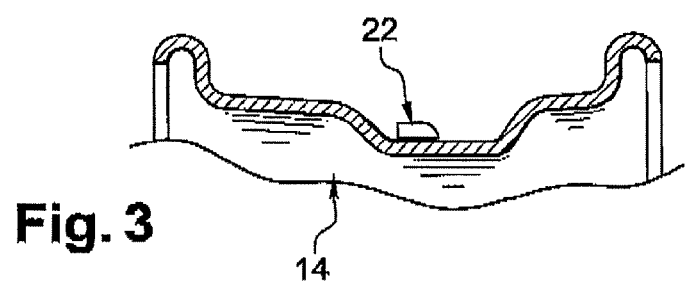
FIG. 3 is an axial section diagram of a wheel of the vehicle shown in FIG. 1, provided with a device in accordance with the present invention.
Figure 4:
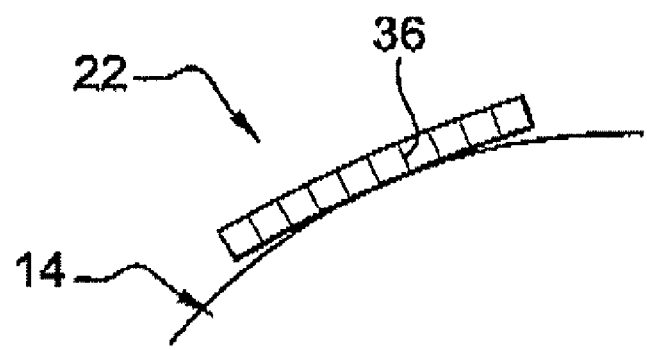
FIG. 4 is a radial section diagram of the wheel shown in FIG. 3.

The pressure sensor 24 and the electronic transmitter/receiver 28 are integrated in a housing 22 having an outside face 34 that supports the antenna 30. The housing 22 is of elongate, prismatic shape and is fixed in an assembly groove of the wheel 14, so that its long dimension extends substantially along an ortho-radial axis of the wheel 14, as can be seen in FIGS. 3 and 4, i.e., an axis that is at right angles to a radius and to the axis of the wheel.

The antenna 30 comprises a cable 36, for example made of copper, which is wound around the housing 22 so as to form a solenoid. When the device 26 is mounted on the wheel 14, the solenoid is oriented along an ortho-radial axis of the wheel 14.

Figure 5:
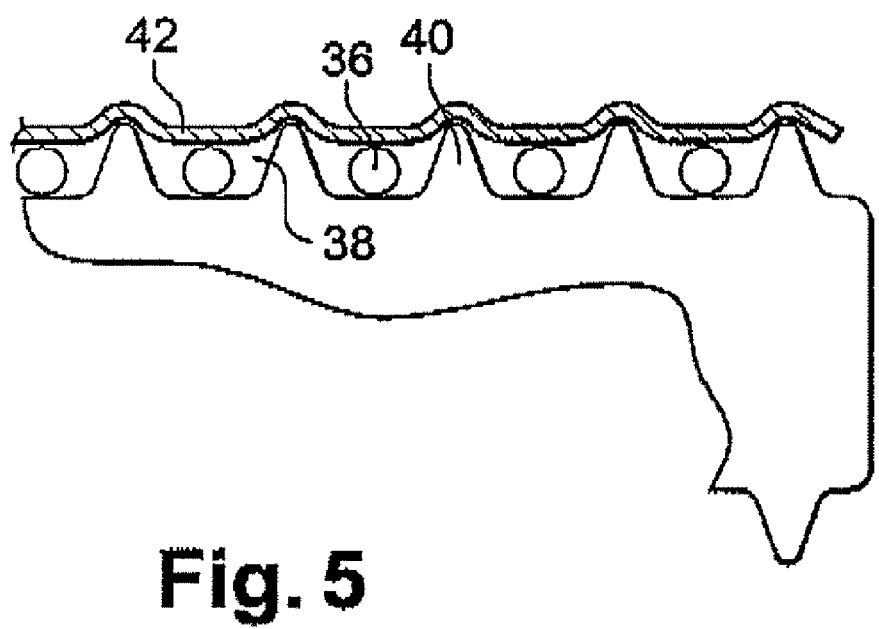
FIG. 5 is a detailed diagram in longitudinal section of the device shown in FIG. 2.

In order to protect the cable 36 while the tire is being mounted on the wheel, the outside face 34 of the housing includes grooves 38, as shown in FIG. 5. The grooves 38 are formed by spaces left empty between ribs 40 formed on the outside face 34 of the housing 22. The grooves 38 are shaped to receive the cable 36 fully, so that the cable is protected by the ribs 40 between the grooves 38 against possible contact. To further improve protection of the cable 36, an outer protective film 42 of heat-shrink material covers the outside face 34 of the housing 22.

Alternatively, the protection of the loops of the antenna 30 can be obtained by molding, for example by injection molding, of the assembly housing 22 and antenna 30. The material constitutive of the molded layer may be identical to the material of the housing.

What is claimed is:

1. A transmission and/or reception device for mounting on a wheel of a vehicle, the device comprising:
    a tire information device configured to provide information relating to a tire;
    a transmitter/receiver electrically connected to the tire information device;
    an antenna electrically connected to the transmitter/receiver for transmitting and/or receiving radio frequency signals; and
    a housing configured to house the tire information device and the transmitter/receiver,
    wherein the antenna is formed by a cable wound around an outside face of the housing.

2. A device according to claim 1, wherein the outside face of the housing is shaped to protect the antenna.

3. A device according to claim 1, wherein the housing is shaped to be positioned on the wheel in such a manner that the wound cable forms a solenoid that is oriented along an ortho-radial axis of the wheel.

4. A device according to claim 1, wherein the outside face of the housing includes grooves configured to receive the cable.

5. A device according to claim 4, wherein at least one of the grooves is shaped to receive the cable fully, in such a manner that the cable is protected by the ridges between the grooves against possible contact.

6. A device according to claim 4, wherein the grooves are formed by spaces between ribs formed on the outside face of the housing.

7. A device according to claim 1, including an outer protective film covering the antenna formed on the outside face of the housing.

8. A device according to claim 7, wherein the film comprises a heat-shrink plastic material.

9. A device according to claim 8, wherein the film comprises at least one of polyethylene and polytetrafluoroethylene (PTFE).

10. A device according to claim 7, wherein the film comprises at least one of polypropylene, polyphenylene sulphide (PPS), and polyamide.

11. A device according to claim 1, wherein an outside protecting layer is molded onto the antenna formed on the outside face of the housing.

12. A device according to claim 11, wherein the molded outside protective layer comprises the same material as the housing.

13. A device according to claim 11, wherein the molded outside protective layer is obtained by injection molding a thermosetting material.

14. A device according to claim 13, wherein the thermosetting material comprises at least one of epoxy resin, phenolic resin, polycarbonate, polyurethane, polyamide, vinyl ester, and polyester.

15. A device according to claim 11, wherein the molded outside protective layer comprises polyphthalamide (PPA).

16. A device according to claim 1, wherein the tire information device comprises a pressure sensor for measuring the pressure inside a tire mounted on the wheel.

17. A housing for a transmission and/or reception device configured to be mounted to a vehicle wheel, the transmission and/or reception device including an antenna, the housing comprising:
    an interior portion for housing the transmission and/or reception device; and
    an outside face shaped to support a cable forming the antenna, wherein the outside face is shaped to support the cable wrapped around the housing in a solenoidal arrangement,
    wherein the housing is shaped to be positioned on the wheel in such a manner that the wound cable forms a solenoid oriented along an ortho-radial axis of the wheel.

18. A housing according to claim 17, wherein the outside face of the housing comprises grooves suitable for receiving the cable.

19. A housing according to claim 18, wherein at least one of the grooves is shaped to receive the cable fully, in such a manner that the cable is protected by the ridges between the grooves against possible contact.

20. A device according to claim 19, wherein the grooves are formed by spaces between ribs formed on the outside face of the housing.

* * * * *